United States Patent
Morris et al.

(10) Patent No.: US 11,692,769 B2
(45) Date of Patent: Jul. 4, 2023

(54) INVENTORY MANAGEMENT SYSTEM FOR A REFRIGERATOR APPLIANCE

(71) Applicant: Haier US Appliance Solutions, Inc., Wilmington, DE (US)

(72) Inventors: Sarah Virginia Morris, Louisville, KY (US); Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 194 days.

(21) Appl. No.: 16/950,284

(22) Filed: Nov. 17, 2020

(65) Prior Publication Data

US 2022/0155007 A1  May 19, 2022

(51) Int. Cl.
*F25D 29/00* (2006.01)
*G06N 20/00* (2019.01)
*G06Q 10/087* (2023.01)

(52) U.S. Cl.
CPC ........... *F25D 29/005* (2013.01); *G06N 20/00* (2019.01); *G06Q 10/087* (2013.01); *F25D 2500/06* (2013.01)

(58) Field of Classification Search
CPC .... F25D 29/005; F25D 29/00; F25D 2500/06; G06N 20/00; G06N 3/0454; G06Q 10/087
See application file for complete search history.

(56) References Cited

U.S. PATENT DOCUMENTS

| | | | |
|---|---|---|---|
| 10,552,707 B2 | 2/2020 | Park | |
| 2017/0048481 A1* | 2/2017 | Ryu | H04N 5/917 |

FOREIGN PATENT DOCUMENTS

| | | | | |
|---|---|---|---|---|
| CN | 105358924 A | * | 2/2016 | ............. F25D 27/00 |
| CN | 107024073 A | * | 8/2017 | ........... F25D 29/003 |
| CN | 107024073 A | | 8/2017 | |
| CN | 110287759 A | * | 9/2019 | ......... G06K 9/00281 |
| JP | 2006317109 A | * | 11/2006 | |
| JP | 2014209048 A | * | 11/2014 | ........... F25D 27/005 |
| JP | 2015/068525 A | | 4/2015 | |
| JP | 2015068525 A | * | 4/2015 | |
| JP | 2017089913 A | * | 5/2017 | |
| JP | 2017/215067 A | | 12/2017 | |
| JP | 2017215067 A | * | 12/2017 | |
| JP | 2020107185 A | * | 7/2020 | |
| KR | 20150132264 A | * | 11/2015 | |
| KR | 20170116388 A | * | 10/2017 | ............. H04N 23/72 |
| WO | WO-2015029824 A1 | * | 3/2015 | ........... F25D 23/028 |
| WO | WO2018/077121 A1 | | 5/2018 | |
| WO | WO-2018077121 A1 | * | 5/2018 | |
| WO | WO-2018123360 A1 | * | 7/2018 | ......... H04N 5/23206 |
| WO | WO-2020222335 A1 | * | 11/2020 | ........... G06F 21/316 |

* cited by examiner

*Primary Examiner* — Emmanuel E Duke
(74) *Attorney, Agent, or Firm* — Dority & Manning, P.A.

(57) ABSTRACT

A refrigerator appliance is provided including a cabinet defining a chilled chamber, a door rotatably hinged to the cabinet to provide selective access to the chilled chamber, and a camera assembly mounted to the cabinet for monitoring the chilled chamber. A controller is operably coupled to the camera assembly and is configured to obtain a raw image using the camera assembly, analyze the raw image to identify an anchor object, crop the raw image to generate a reduced image surrounding the anchor object, and analyze the reduced image to identify a food item being added to or removed from the chilled chamber.

20 Claims, 4 Drawing Sheets

INVENTORY MANAGEMENT SYSTEM FOR A REFRIGERATOR APPLIANCE

FIELD OF THE INVENTION

The present subject matter relates generally to refrigerator appliances, and more particularly to inventory management systems for refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Notably, it is frequently desirable to monitor food items in the refrigerator appliance, have knowledge of what food items are added to or removed from within the refrigerator appliance, and other information related to the presence of food items. Certain conventional refrigerator appliances have systems for monitoring food items as they are added or removed from the refrigerator appliance. However, such systems often require user interaction, e.g., via direct input through a control panel as to the food items added or removed. By contrast, certain appliances include a camera for taking images of food items as they are added. However, analysis of these images is very computationally intensive, requires large amounts of processing power and memory, and may inaccurately identify the food items.

Accordingly, a refrigerator appliance with systems for improved inventory management would be useful. More particularly, an inventory management system that includes features for monitoring food items that are added or removed from a refrigerator appliance while minimizing computer resources would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance includes a cabinet defining a chilled chamber, a door being rotatably hinged to the cabinet to provide selective access to the chilled chamber, a camera assembly mounted to the cabinet for monitoring the chilled chamber, and a controller operably coupled to the camera assembly. The controller is configured to obtain a raw image using the camera assembly, analyze the raw image to identify an anchor object, crop the raw image to generate a reduced image surrounding the anchor object, and analyze the reduced image to identify a food item being added to or removed from the chilled chamber.

In another exemplary embodiment, a method of implementing inventory management within a refrigerator appliance is provided. The refrigerator appliance includes a chilled chamber and a camera assembly positioned for monitoring the chilled chamber. The method includes obtaining a raw image using the camera assembly, analyzing the raw image to identify an anchor object, cropping the raw image to generate a reduced image surrounding the anchor object, and analyzing the reduced image to identify a food item being added to or removed from the chilled chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
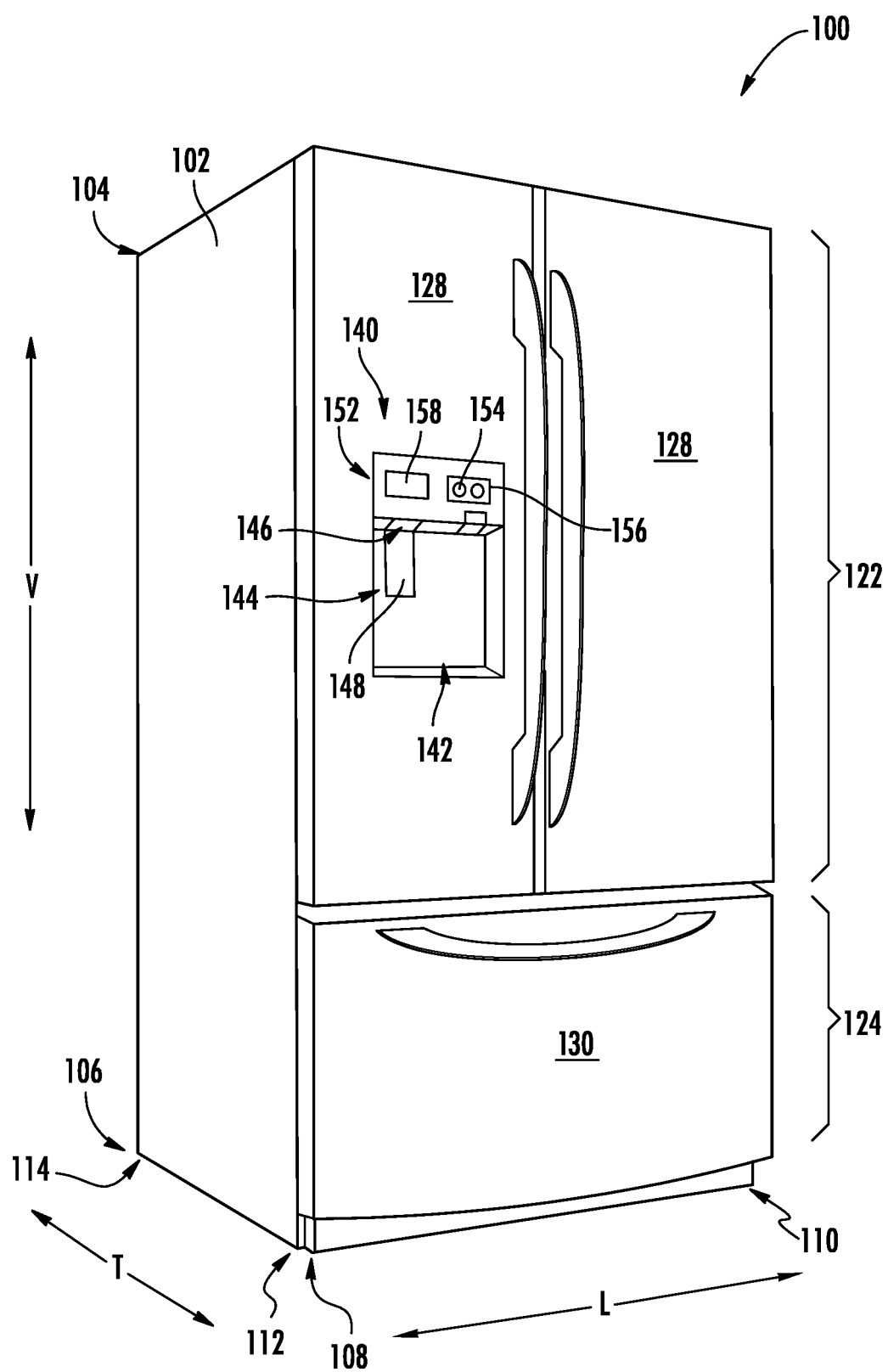
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well, such as other appliances including fluid dispensers. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
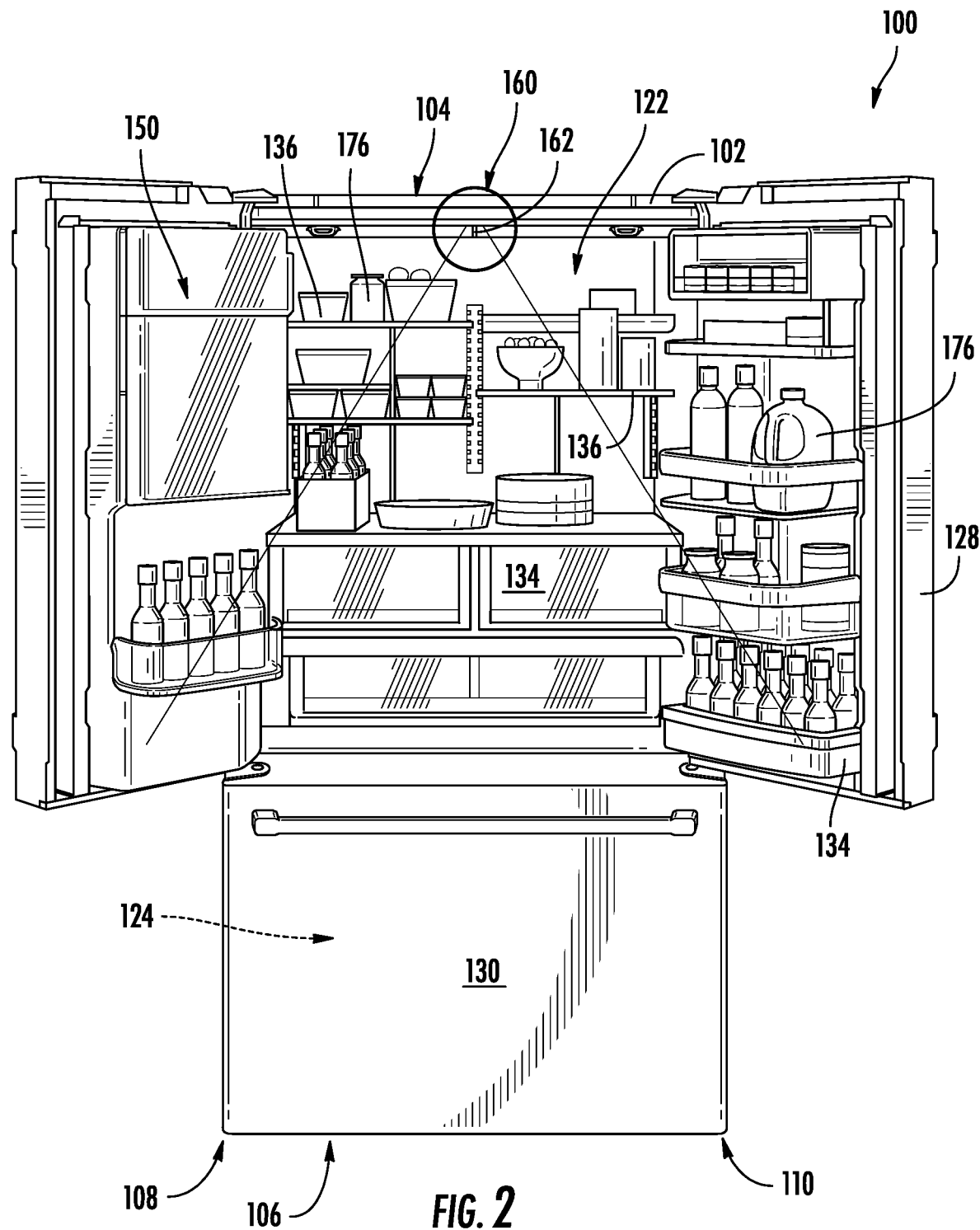
FIG. 2 provides a perspective view of the exemplary refrigerator appliance of FIG. 1, with the doors of the fresh food chamber shown in an open position to reveal a camera assembly according to an exemplary embodiment of the present subject matter.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touch-screen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now specifically to FIG. 2, refrigerator appliance 100 may further include a camera assembly 160 that is generally positioned and configured for obtaining images of refrigerator appliance 100 during operation. Specifically, according to the illustrated embodiment, camera assembly 160 includes a camera 162 that is mounted to top end 104 of cabinet 102. Specifically, camera 162 is mounted such that is faces downward along the vertical direction V toward chilled chambers of refrigerator appliance 100. As illustrated, camera 162 is generally oriented for monitoring an entrance to fresh food chamber 122, e.g., for monitoring items added or removed from fresh food chamber, as described in more detail below. According to still other embodiments, camera 162 may be oriented in any other suitable manner for monitoring any other suitable region within or around refrigerator appliance 100.

In general, camera 162 can take images or video of fresh food chamber 122 and surrounding areas. Specifically, camera 162 may be activated when refrigerator doors 128 are opened to identify items added to or removed from fresh food chamber 122. Although camera assembly 160 is illustrated as including a single camera 162 positioned over and configured for monitoring fresh food chamber 122, it should be appreciated that according to alternative embodiments, camera assembly 160 may include any suitable number, type, size, and configuration of camera(s) 162 for obtaining images of any suitable areas or regions within or around refrigerator appliance 100. For example, camera assembly 160 may include a plurality of cameras 162, each camera 162 being positioned for monitoring a single chilled chamber or section of a chilled chamber (e.g., fresh food chamber 122 and freezer chamber 124).

According still other embodiments, camera assembly 160 may include features for adjusting the field-of-view and/or orientation of camera 162, such that a single camera 162 may be adjusted to monitor fresh food chamber 122, freezer chamber 124, and/or other chambers simultaneously. It should be appreciated that the images obtained by camera assembly 160 may vary in number, frequency, angle, resolution, detail, etc. in order to improve the clarity of the particular regions surrounding or within refrigerator appliance 100. In addition, according to exemplary embodiments, controller 156 may be configured for illuminating the chilled chamber using one or more light sources prior to obtaining images. Notably, controller 156 of refrigerator appliance 100 (or any other suitable dedicated controller) may be communicatively coupled to camera assembly 160 and may be programmed or configured for analyzing the images obtained by camera assembly 160, e.g., in order to identify items being added or removed from refrigerator appliance 100, as described in detail below.

Now that the construction and configuration of refrigerator appliance 100 and camera assembly 160 have been presented according to an exemplary embodiment of the present subject matter, an exemplary method 200 for operating a camera assembly 160 is provided. Method 200 can be used to operate camera assembly 160, or to operate any other suitable camera assembly for monitoring appliance operation or inventory. In this regard, for example, controller 156 may be configured for implementing method 200. However, it should be appreciated that the exemplary method 200 is discussed herein only to describe exemplary aspects of the present subject matter, and is not intended to be limiting.

Figure 3:
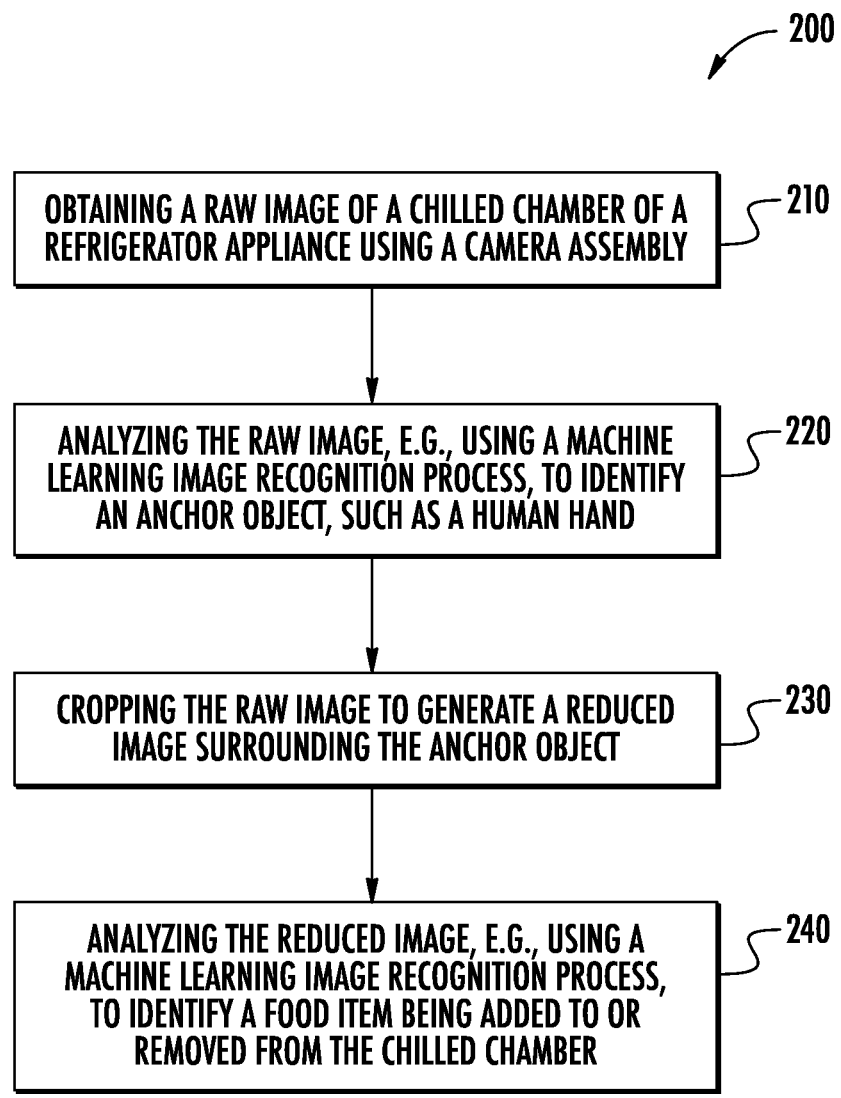
FIG. 3 provides a method for operating an inventory management system of a refrigerator appliance according to an exemplary embodiment of the present subject matter.
Figure 4:
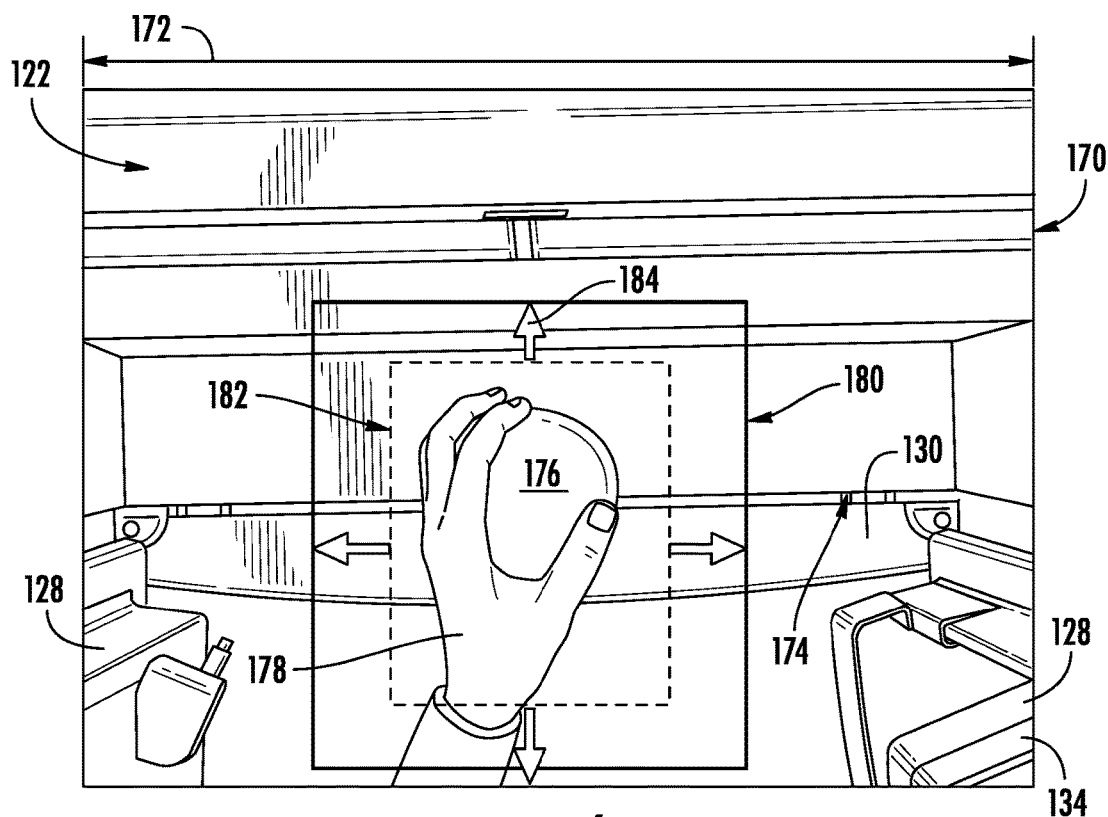
FIG. 4 provides an image obtained by the exemplary camera assembly of FIG. 2 according to an exemplary embodiment of the present subject matter.
Figure 5:
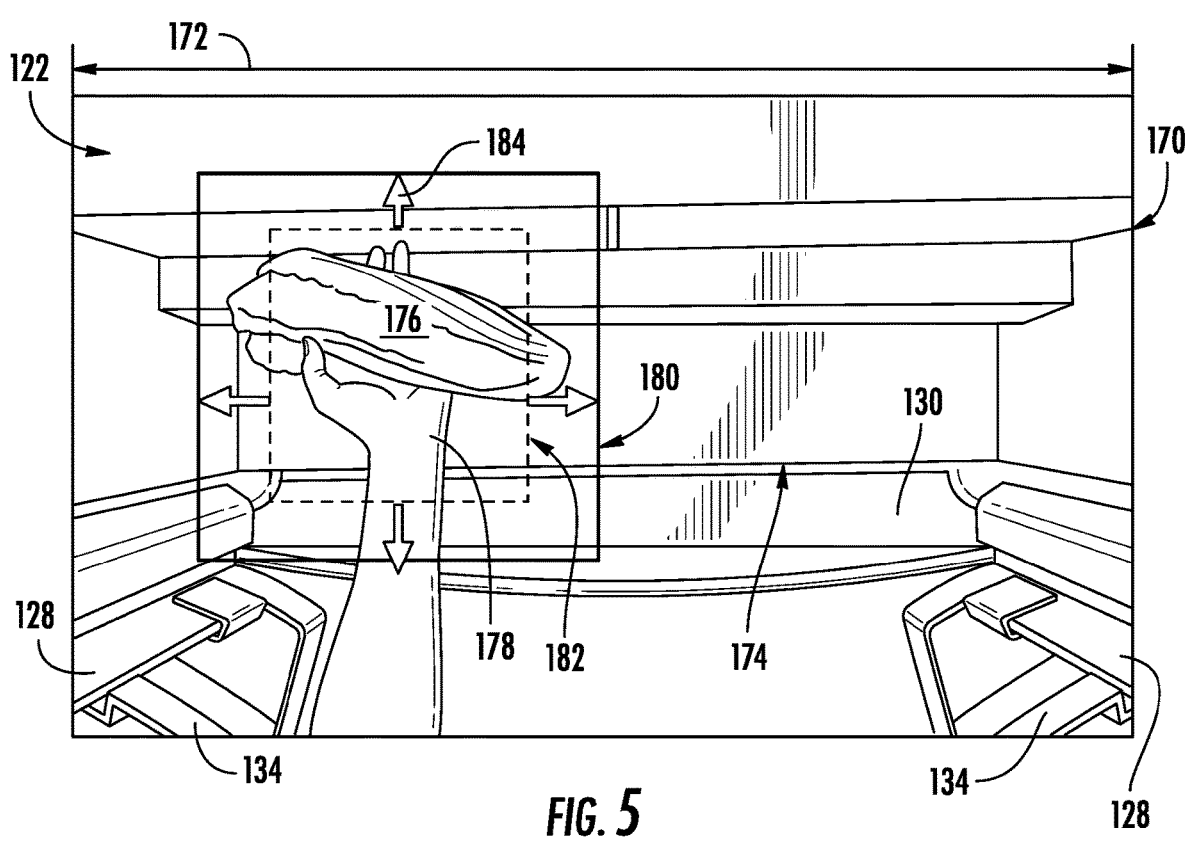
FIG. 5 provides another image obtained by the exemplary camera assembly of FIG. 2 according to an exemplary embodiment of the present subject matter.

As shown in FIG. 3, method 200 includes, at step 210, obtaining a raw image of a chilled chamber of a refrigerator appliance using a camera assembly. In this regard, continuing example from above, camera assembly 160 of refrigerator appliance 100 may obtain one or more raw images (e.g., identified in FIGS. 4 and 5 generally by reference numeral 170) of fresh food chamber 122, freezer chamber 124, or any other zone or region within or around refrigerator appliance 100. Specifically, according to an exemplary embodiment, camera 162 is oriented down from a top center of cabinet 102 and has a field-of-view (e.g., as shown in the photos of FIGS. 4 and 5) that covers a width 172 of fresh food chamber 122. Moreover, this field-of-view may be centered on an opening 174 at a front of cabinet 102, e.g., where refrigerator doors 128 are seated against a front of cabinet 102. In this manner, the field-of-view of camera 162, and the resulting raw images obtained, may capture any motion or movement of an object into and/or out of fresh food chamber 122.

In this regard, continuing the example from above, camera assembly 160 may take one or more raw images 170, which may include one or more still images, one or more video clips, or any other suitable type and number of images suitable for identification of food items (e.g., identified generally by reference numeral 176) or inventory analysis. According to exemplary embodiments, the raw images 170 may be obtained continuously or periodically while refrigerator doors 128 are open. In this regard, obtaining raw images 170 may include determining that the door of the refrigerator appliance is open and capturing images at a set frame rate while the door is open. Notably, the motion of the food items between raw image frames may be used to determine whether the food item 176 is being removed from or added into fresh food chamber 122. It should be appreciated that the images obtained by camera assembly 160 may vary in number, frequency, angle, resolution, detail, etc. in order to improve the clarity of food items 176. In addition, according to exemplary embodiments, controller 156 may be configured for illuminating a refrigerator light (not shown) while obtaining raw images 170.

Notably, the raw image 170 obtained at step 210 may be used to facilitate inventory management within refrigerator appliance 100. In this regard, the raw image 170 may be analyzed to identify food items 176 that are being inserted into or removed fresh food chamber 122. Notably, analysis of a larger raw images is typically more computationally intensive, requiring more processing power and/or memory, e.g., at controller 156. Moreover, analysis of regions that are distant from or otherwise not associated with food items 176 may reduce the computational efficiency, result in a waste of computer resources, and may introduce errors or inaccuracies into the image analysis. As a result, aspects of the present subject matter are directed to methods of reducing the overall size of raw images 170 to facilitate improved object detection with reduced use of computer resources.

Step 220 includes analyzing the raw image to identify an anchor object. Specifically, according to exemplary embodiments, an anchor object 178 may be a human hand that is positioning food items 176 into fresh food chamber 122. According to still other embodiments, anchor object 178 may be any object that is used add or remove food items 176 from fresh food chamber 122. In this regard, for example, anchor object 178 may be packaging within which food items 176 are positioned, a shopping bag, or any other suitable object.

It should be appreciated that anchor object 178 may be identified in raw image 170 using any suitable image analysis techniques, image decomposition, image segmentation, image processing, etc. This analysis may be performed entirely by controller 156, may be offloaded to a remote server for analysis, may be analyzed with user assistance (e.g., via control panel 152), or may be analyzed in any other suitable manner. According to exemplary embodiments of the present subject matter, the analysis performed at step 220 may include a machine learning image recognition process.

As used herein, the terms image recognition process, anchor object detection, food item detection, and similar terms may be used generally to refer to any suitable method of observation, analysis, image decomposition, feature extraction, image classification, etc. of one or more image or videos taken by camera assembly 160 within or around refrigerator appliance 100. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 160 and controller 156 may be programmed to perform such processes and implement an inventory management process.

According to an exemplary embodiment, controller may implement a form of image recognition called region based convolutional neural network ("R-CNN") image recognition. Generally speaking, R-CNN may include taking an input image and extracting region proposals that include a potential object, such as a particular anchor object 178 or food item 176. In this regard, a "region proposal" may be regions in an image that could belong to a particular object, such as a particular anchor object 178 or food item 176. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 220 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to identify anchor object 178 or food item 176. In addition, a K-means algorithm may be used. Other image recognition processes are possible and within the scope of the present subject matter.

It should be appreciated that any other suitable image recognition process may be used while remaining within the scope of the present subject matter. For example, step 220 of analyzing the raw image may include using a deep belief network ("DBN") image recognition process. A DBN image recognition process may generally include stacking many individual unsupervised networks that use each network's hidden layer as the input for the next layer. According to still other embodiments, step 220 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Step 230 may include cropping the raw image to generate a reduced image surrounding the anchor object. In this regard, for example, step 230 may include any suitable image reduction techniques, segmentation techniques, cropping techniques, or object isolation techniques for creating a reduced image (e.g. as identified generally by reference numeral 180 in FIGS. 4 and 5). In general, reduced image 180 may be any suitable size that is smaller than raw image 170 and that may be used for further analysis and food item detection, as will be described in more detail below. Although exemplary techniques of cropping raw image 170 are described herein, it should be appreciated that these techniques are not intended to limit the scope of the present subject matter.

According to exemplary embodiments of the present subject matter, step 230 of cropping the raw image 170 to generate the reduced image 180 may include identifying an anchor boundary of the anchor object and cropping the raw image to generate the reduced image that includes the anchor boundary and an expanded region of interest. In this regard, referring specifically to FIGS. 4 and 5, anchor boundary (identified generally by reference numeral 182) may be a rectangular region including or closely enclosing the human hand or which may otherwise correspond to a boundary of the human hand. After the anchor boundary 182 is determined, an expanded region of interest (identified generally by arrows 184 as the space between anchor boundary 182 and reduced image 180) may be added to anchor boundary 182 to establish the reduced image 180. Areas of raw image 170 outside of reduced image 180 may be deleted or otherwise removed.

In general, the expanded area of interest 184 is intended to include the boundaries of food item 176 that are being held or positioned by anchor object 178. In this manner, if the reduced image 180 only included anchor object 178, image analysis may not include identification of important portions of food item 176. As a result, reduced image 180 may be larger than anchor boundary 182. It should be appreciated various methods to determine or identify the expanded area of interest 184 may be used while remaining within the scope of the present subject matter. For example, according to an exemplary embodiment, the expanded region of interest 184 is a fixed area or dimensional increase to anchor boundary 182. For example, the dimensions of anchor boundary 182 may be increased by fixed percentage or dimension. In this regard, the width and/or depth of anchor boundary 182 may be increased by 20%, 40%, 50%, 60%, or greater. This percentage increase may be based, for example, on the relative dimension of anchor object 178 to typical food items 176 positioned within a food chamber 122.

According to still other embodiments, the expanded region of interest 184 may be determined by identifying pixel characteristics associated with anchor object 178 and/or food items 176. In this regard, expanded area of interest 184 may be determined by identifying pixel characteristics of anchor object 178 and food item 176, and determining the expanded region of interest 184 to include areas outside of anchor boundary 182 that have pixel characteristics similar to the pixel characteristics of anchor object 178 and food item 176. In this regard, for example, image analysis may be performed to determine a color, intensity, texture, or other visible features of anchor object 178 and food item 176, and the expanded region of interest 184 may be sized to include pixels of raw image 170 that includes similar features. For example, if the food item 176 is green lettuce, the expanded region of interest 184 may include pixels adjacent to anchor boundary 182 that include green or substantially green pixels. By contrast, if food item 176 is a bag of apples, the expanded region of interest 184 may include red pixels. It should be appreciated that the pixels included in the expanded region of interest 184 may be identified and isolated in any other suitable manner.

Step 240 may include analyzing the reduced image to identify a food item being added to or removed from the chilled chamber. In this regard, continuing example from above, controller 156 or another suitable processing device may analyze reduced image 180 to identify food items 176. By identifying whether food item 176 is being added to or removed from fresh food chamber 122, controller 156 may monitor and track inventory within refrigerator appliance 100. For example, controller 156 may maintain a record of food items positioned within or removed from fresh food chamber 122. Notably, it should be appreciated that the image analysis performed at step 240 may include a machine learning image recognition process. For example, a machine learning image recognition process may include the same or similar image analysis techniques described above with respect to step 220. Notably, however, such image analysis is performed on a smaller reduced image 180, as opposed to the larger raw image 170. In this manner, food items 176 may be detected while minimizing or reducing the necessary processing power, computer memory, or other computational resources.

FIG. 3 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of these methods are explained using camera assembly 160 as an example, it should be appreciated that these methods may be applied to the operation of any suitable appliance and/or camera assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
    a cabinet defining a chilled chamber;
    a door being rotatably hinged to the cabinet to provide selective access to the chilled chamber;
    a camera assembly mounted to the cabinet for monitoring the chilled chamber; and
    a controller operably coupled to the camera assembly, the controller being configured to:
        obtain a raw image using the camera assembly;
        analyze the raw image to identify an anchor object;
        crop the raw image to generate a reduced image surrounding the anchor object; and
        analyze the reduced image to identify a food item being added to or removed from the chilled chamber.

2. The refrigerator appliance of claim 1, wherein obtaining the raw image using the camera assembly comprises:
    determining that the door of the refrigerator appliance is open; and
    capturing images at a set frame rate while the door is open.

3. The refrigerator appliance of claim 1, wherein analyzing the raw image to identify the anchor object comprises:
    analyzing the raw image using a machine learning image recognition process to identify the anchor object.

4. The refrigerator appliance of claim 3, wherein the machine learning image recognition process comprises at least one of a convolution neural network ("CNN"), a region-based convolution neural network ("R-CNN"), a deep belief network ("DBN"), or a deep neural network ("DNN") image recognition process.

5. The refrigerator appliance of claim 1, wherein analyzing the reduced image to identify the food item comprises:
    analyzing the reduced image using a machine learning image recognition process to identify the food item.

6. The refrigerator appliance of claim 5, wherein the machine learning image recognition process comprises at least one of a convolution neural network ("CNN"), a region-based convolution neural network ("R-CNN"), a deep belief network ("DBN"), or a deep neural network ("DNN") image recognition process.

7. The refrigerator appliance of claim 1, wherein the anchor object is a human hand.

8. The refrigerator appliance of claim 1, wherein cropping the raw image to generate the reduced image surrounding the anchor object comprises:
    identifying an anchor boundary of the anchor object; and
    cropping the raw image to generate the reduced image that includes the anchor boundary and an expanded region of interest.

9. The refrigerator appliance of claim 8, wherein the expanded region of interest is a fixed area larger than the anchor boundary.

10. The refrigerator appliance of claim 8, wherein the expanded region of interest is determined by:
    identifying pixel characteristics of the anchor object and the food item; and
    determining the expanded region of interest to include areas outside of the anchor boundary that have pixel characteristics similar to the pixel characteristics of the anchor object and the food item.

11. The refrigerator appliance of claim 1, wherein the camera assembly comprises:
    a camera mounted to a top of the cabinet, the camera being oriented downward along a vertical direction.

12. The refrigerator appliance of claim 1, wherein the camera assembly comprises:
    a plurality of cameras positioned within the cabinet, each of the plurality of cameras having a specified monitoring zone or range.

13. The refrigerator appliance of claim 1, wherein the controller is further configured to:
> maintain a record of food items positioned within or removed from the chilled chamber.

14. A method of implementing inventory management within a refrigerator appliance, the refrigerator appliance comprising a chilled chamber and a camera assembly positioned for monitoring the chilled chamber, the method comprising:
> obtaining a raw image using the camera assembly;
> analyzing the raw image to identify an anchor object;
> cropping the raw image to generate a reduced image surrounding the anchor object; and
> analyzing the reduced image to identify a food item being added to or removed from the chilled chamber.

15. The method of claim 14, wherein analyzing the raw image to identify the anchor object comprises:
> analyzing the raw image using a machine learning image recognition process to identify the anchor object.

16. The method of claim 14, wherein analyzing the reduced image to identify the food item comprises:
> analyzing the reduced image using a machine learning image recognition process to identify the food item.

17. The method of claim 14, wherein the anchor object is a human hand.

18. The method of claim 14, wherein cropping the raw image to generate the reduced image surrounding the anchor object comprises:
> identifying an anchor boundary of the anchor object; and
> cropping the raw image to generate the reduced image that includes the anchor boundary and an expanded region of interest.

19. The method of claim 18, wherein the expanded region of interest is a fixed area larger than the anchor boundary.

20. The method of claim 18, wherein the expanded region of interest is determined by:
> identifying pixel characteristics of the anchor object and the food item; and
> determining the expanded region of interest to include areas outside of the anchor boundary that have pixel characteristics similar to the pixel characteristics of the anchor object and the food item.

\* \* \* \* \*